US006780396B2

(12) United States Patent
Streicher

(10) Patent No.: US 6,780,396 B2
(45) Date of Patent: Aug. 24, 2004

(54) PROCESS FOR THE PRODUCTION OF A GAS THAT CONTAINS HYDROGEN FROM HYDROGEN SULFIDE

(75) Inventor: Christian Streicher, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 63 days.

(21) Appl. No.: 10/134,646

(22) Filed: Apr. 30, 2002

(65) Prior Publication Data

US 2003/0031607 A1 Feb. 13, 2003

(30) Foreign Application Priority Data

Apr. 30, 2001 (FR) .............................................. 01 05848

(51) Int. Cl.[7] .................................................. C01B 3/04
(52) U.S. Cl. .................................. 423/658.2; 423/648.1
(58) Field of Search .............................. 423/220, 224, 423/230, 539, 542, 564, 576.2, 576.4, 546.8, 648.1, 658.2

(56) References Cited

U.S. PATENT DOCUMENTS 4,302,434 A 11/1981 Hellmer et al.
4,461,755 A 7/1984 Daley et al.
4,481,181 A 11/1984 Norman
4,684,514 A * 8/1987 Chen ........................ 423/574.1
5,324,486 A * 6/1994 Russo ......................... 422/207

FOREIGN PATENT DOCUMENTS

| FR | 1 461 303 | | 2/1966 | |
| FR | 2 238 668 | | 2/1975 | |
| JP | 01270502 A | * | 10/1989 | ............. C01B/3/04 |

* cited by examiner

Primary Examiner—Stanley S. Silverman
Assistant Examiner—Maribel Medina
(74) Attorney, Agent, or Firm—Millen, White, Zelano & Branigan, P.C.

(57) ABSTRACT

A process for the production of hydrogen from a hydrogen sulfide feedstock, comprising a stage for heating feedstock (1) in a heating zone (2, 5) to a suitable temperature so as to produce a hot gas (6) that contains hydrogen and elementary sulfur, whereby this heating is carried out at least in part by an external heat source and a stage for rapid cooling of the hot gas thus obtained, by mixing with a fluid (8) by means of at least one mixer (7), preferably an ejector, so as to obtain a gaseous effluent (9). The mixing time is less than 20 milliseconds. Elementary sulfur (11) is separated from this effluent and the hydrogen is recovered.

Application for the elimination of hydrogen sulfide and the production of hydrogen.

23 Claims, 3 Drawing Sheets

PROCESS FOR THE PRODUCTION OF A GAS THAT CONTAINS HYDROGEN FROM HYDROGEN SULFIDE

The invention relates to a process and a device that make it possible to produce a hydrogen-rich gas from a gas that contains H2S.

The technological background is illustrated by U.S. Pat. Nos. 4,481,181, 4,461,755, 4,302,434, FR-A-1 461 303 and FR-A-2 238 668.

H2S is a highly toxic compound that is present in many natural gases. It is also found in refinery gases, where it is generally obtained from decomposition reactions of sulfur-containing organic compounds that are naturally present in crude oils. The H2S is produced in particular in large amounts during hydrodesulfurization operations. These operations make it possible to lower the sulfur content of petroleum fractions by a treatment with hydrogen in the presence of suitable catalysts.

It is conventional both in a refinery as well as in natural gas production to extract the H2S that is present in the gases by a scrubbing with a suitable solvent, for example an amine-based solution. This solvent is then regenerated, generally by heating, which then produces a so-called acid gas that is rich in H2S. In a refinery, such an acid gas usually contains more than 90% H2S with minor contents of CO2, steam and hydrocarbons (methane and other heavier hydrocarbons).

Taking into account the toxicity of the H2S, this gas cannot be emitted into the atmosphere. Its combustion would generate considerable amounts of SO2 and SO3, polluting compounds of which it is also sought to reduce the releases into the atmosphere. The most generally used method for treating these acid gases consists in admitting them into a so-called Claus unit that makes it possible to convert H2S into elementary sulfur, a non-polluting compound that can be easily transported and marketed, for example for the production of sulfuric acid.

The Claus units comprise a thermal stage in which about one third of the H2S that is present in SO2 is oxidized by combustion with air (reaction (1)), and even in some cases with oxygen-enriched air. During this partial combustion, a portion of the SO2 that is formed reacts with H2S to form elementary sulfur according to Claus reaction (2):

  (1)

  (2)

  (3)

The hot gas that is thus obtained is then cooled in a steam boiler to a temperature that allows the condensation of elementary sulfur. After the condensed elementary sulfur is separated, the gas that contains the residual SO2 and H2S is sent to one or more (generally 2 to 3) catalytic stages where the Claus reaction is continued. Each catalytic stage consists of a stage for reheating the gas followed by a reaction stage in the presence of a suitable catalyst and finally a stage for cooling the gas for separating by condensation the elementary sulfur that is formed in the reactor.

The Claus process that is usually used makes it possible to convert into elementary sulfur only about 95 to 97% of the H2S that is treated. To limit the releases of sulfur-containing gases into the atmosphere, the gas that exits from the Claus process is usually treated in a so-called Claus tail gas treatment unit. There is a large variety of units of this type, generally complex and almost as costly in investment as the Claus unit itself.

It is seen therefore that the conversion of H2S into elementary sulfur by this method, although effective, remains a complex and costly operation.

In addition, the overall material balance of the operation amounts to forming one mol of elementary sulfur and one mol of water (reaction of balance (3)) for each H2S mol.

The decomposition of H2S into elementary sulfur and hydrogen (reaction (4)) would allow not only H2S to be converted into elementary sulfur but also hydrogen, gas with high added value, to be produced, which is also in high demand for various refining operations of crude oils (hydrotreatments).

  (4)

This is why numerous authors have attempted to develop processes that make it possible to carry out in an economical manner such a decomposition. An examination of the various methods that are explored can be found in, for example, "H2S A Potential Source of Hydrogen" that was published by Sulphur No. 244, May–June 1996, pp. 37–47. To this day, however, it seems that no process is the subject of a large-scale industrial implementation, generally due to the inadequate conversion ratios or high operating costs.

The decomposition of H2S by an electrolytic method, such as the one developed by the Idemistsu Kosan Company, makes it possible to obtain an almost total conversion of H2S into elementary sulfur and hydrogen, but the use of electricity as the sole energy source leads to a high operating cost.

It is also the use of electricity as the sole energy source that penalizes the process by plasmalysis developed by the Kurchatov Russian Institute.

The "Hysulf" process developed by the Marathon Oil Company makes it possible to obtain hydrogen by using only thermal energy, owing to the use of organic compounds that are hydrogenated by H2S in a first step, then dehydrogenated by catalytic reforming in a second step. It is generally admitted, however, that during such reduction-oxidation cycles, the organic compounds tend to deteriorate and that consequently the processes that are based on this type of reaction most often also lead to relatively high operating costs because of the supply of chemical products that are necessary for compensating the secondary degradation reactions.

The thermal cracking method developed by the Alberta Sulphur Research Laboratory (ASRL) also makes it possible to use only thermal energy for decomposing H2S, whereby this energy is supplied directly by the flame of a thermal stage of the Claus process. The outputs of conversions that are obtained are relatively low (limited to about 35%), however, primarily for two reasons:

the theoretical limitations due to the thermodynamic equilibrium between H2S, H2 and elementary sulfur; the decomposition of H2S that becomes important only at very high temperature (1100° C. and beyond), the difficulty in cooling very quickly the high-temperature mixture that contains hydrogen. Actually, during the cooling, the hydrogen and the elementary sulfur that are formed at high temperature have a tendency to recombine very quickly into H2S.

This last phenomenon is particularly important if it is desired to obtain a high hydrogen yield by thermal method, which therefore requires the use of very high temperatures. This phenomenon was studied in particular inside the furnaces of the Claus units (see, for example, "What Happens to Hydrogen in a Claus Plant," published by Sulphur No.

214, May–June 1991, pp. 53–60). It is seen that with a dwell time, such that it is typically found in the boilers that are downstream from the Claus units, of between 0.5 and 1.5 seconds, the major portion of the hydrogen that is formed in a Claus furnace is recombined into H2S. Even with a time of cooling to 600° C. of 50 ms, only 80% of the hydrogen that is formed at equilibrium at 1300° C. in a Claus furnace would be recovered. In "*Production of Hydrogen and Sulphide from Hydrogen Sulfide in Refineries and Processing Plants,*" published by P. D. Clark & al. in the Sulphur 95 Conference, the impact on the final hydrogen yield, of a time of cooling to 500° C., for a mixture of hydrogen, H2S and elementary sulfur at equilibrium at 1200° C. is indicated. It is seen that to limit the hydrogen yield losses, a cooling time of less than 10 ms is necessary, and shorter periods on the order of 1 ms are even desirable. Such short cooling times are virtually impossible to achieve, however, by external heat exchange.

The approach is then to consider a cooling by mixing with a colder fluid (quench), but there again, it is technically difficult to attain mixing times that are short enough to avoid a significant recombining of hydrogen into H2S.

This invention has as its object a process and a device that make it possible to generate hydrogen from H2S by thermal method by eliminating drawbacks of the prior art, in particular by reducing the recombination of hydrogen into H2S with elementary sulfur formed during the cooling of the high-temperature gas and, by the use of mixers, that make it possible to obtain very short cooling times, generally less than 20 ms and preferably less than 2 ms, by mixing with a cold fluid so as to recover at least 80% of the hydrogen that is formed at equilibrium at temperature T1 and preferably at least 90%.

More specifically, the invention relates to a process for the production of a gas that contains hydrogen from a feedstock that contains at least H2S, comprising at least the following stages:

Stage 1: Generation of a gaseous effluent that contains at least the hydrogen and the elementary sulfur from the feedstock, Stage 2: Separation of the effluent from the elementary sulfur and recovery of a gas that contains hydrogen, characterized in that stage 1 comprises:

A stage for heating the feedstock that contains the H2S in at least one heating zone to a temperature T1 so as to produce a hot gas that contains at least hydrogen and elementary sulfur, obtained by decomposition of the H2S, whereby this heating is carried out at least in part by an external heat source, A stage for quick cooling of the hot gas that is thus obtained, by mixing with a fluid FQ at a suitable temperature T2 by means of at least one mixer, preferably an ejector, so as to obtain the gaseous effluent at a suitable temperature T3, under conditions such that the mixing time is less than 20 milliseconds.

It is possible to use advantageously as a mixer a conventional liquid-gas ejector or a gas-gas ejector, preferably a gas-gas ejector that is suitable for mixing the gases well and whose motive fluid speed is advantageously supersonic.

Another object of the invention is to propose a method for heating the gas that contains H2S that makes it possible both to attain very high temperatures that promote the decomposition of H2S and the production of hydrogen, while avoiding recourse to an expensive external heat source such as electricity.

More particularly under this object, the invention relates to a process in which the stage for heating the gas that contains the H2S can be carried out in 2 consecutive sub-stages:

Heating of the gas that contains H2S to a temperature T4 by an external heat source, Heating of the gas that is thus obtained of temperature T4 to temperature T1 by reaction with a gas that contains oxygen, such as air, oxygen enriched air, or preferably industrially pure oxygen.

Finally, the invention has as its last object a process that combines the process of the invention with a hydrodesulfurization process, which makes it possible to minimize the equipment that is necessary for the purification and to use the hydrogen that is produced by the process' of the invention.

According to this object, the invention relates to a process in which the gas mixture that is obtained from stage 2 and from which elementary sulfur and the major portion of the water are removed, can be compressed to be sent to a hydrodesulfurization unit that comprises a downstream amine scrubbing stage of the hydrogen containing effluent, and the resultant hydrogen can then be recycled to the hydrodesulfurization reaction section, upstream from said washing stage.

The invention also relates to a device for the implementation of the process. In particular, it relates to a unit for production of a gas that contains hydrogen, comprising at least one ceramic furnace, a supply of a feedstock that contains at least hydrogen sulfide, an output of an effluent that contains hydrogen, elementary sulfur and H2S, means for separating components of the effluent and means for collecting gas that contains hydrogen, connected to means for separation of the components of the effluent, wherein in said unit the furnace that is connected at least in part to an external heat source, and at least one means for mixing the effluent with a coolant, is connected to the outlet of the furnace, so as to cool the mixture that is thus obtained to a temperature T3, under conditions such that the mixing time is less than 20 milliseconds, and said mixing means is connected to the separating means.

According to a characteristic of the device, the furnace can comprise in a first part, on the feedstock feed side, means that are suitable for heating the feedstock with an external heat source, and in an adjacent second part, combustion means for combusting an effluent that is produced in the first part and which is connected to a means for input of a gas that contains oxygen, and said furnace has an outlet for passing the combustion effluent to mixing means.

According to a variant, the means for separating the components of the effluent can comprise at least one means (10) for condensation of the elementary sulfur that has an inlet connected to mixing means (7) and an effluent outlet that is connected to a heater (13), whereby said heater is connected to a reactor (15) for catalytic hydrogenation of the components of the effluent, whereby the reactor has an outlet connected to a water condenser (18), the water condenser has two outlets, one is connected via a water pumping means (25) and a heater (26) to an inlet of mixing means (7), the other outlet of the water condenser is connected to a unit (20) for separating the H2S/H2 components, whereby said separation unit is connected by one of its outlets that contains H2S to furnace (2) and by the other outlet to means (21) for collecting hydrogen.

A Claus unit that comprises a heater (33) that is connected to a Claus reactor (35) that contains a suitable catalyst that is connected in its turn to a sulfur condenser (38) can be interposed between sulfur condensation means (10) and heater (13) upstream from the catalytic hydrogenation reactor, whereby said condenser has a first sulfur outlet and a second outlet connected to heater (13) upstream from the catalytic hydrogenation reactor.

BRIEF DESCRIPTION OF THE DRAWING

The invention will be better understood based on the following figures that illustrate diagrammatically the process and the device, among which:

FIG. 1 illustrates the principle of the invention and the two main stages that it comprises.

DETAILED DESCRIPTION OF FIGURES

Figure 1:
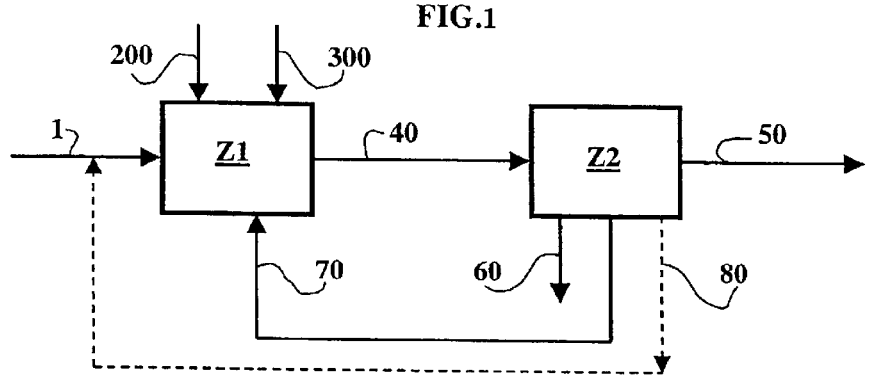
FIG. 1 illustrates the principle of the invention.

Stage Z1 consists in generating a gas that contains hydrogen and that is obtained by thermal decomposition of H2S. The H2S that is obtained from a unit that is upstream from the invention, for example an amine washing unit, is admitted via a line 1. It should be noted that this H2S can contain in variable proportions various impurities such as methane or other heavier hydrocarbons and CO2, without the latter having an adverse effect on the operation of the process of the invention. If stage Z2 for separation/conversion of the gas components generated by stage Z1 comprises a stage for extraction of residual H2S, for example by amine washing, this residual H2S can then also be recycled upstream of stage Z1 and mixed with the $H_2S$ in line 1.

Stage Z1 comprises a first stage for heating H2S to a temperature T1 during which the decomposition of H2S is carried out. This heating stage can be carried out only by an external heat source, symbolized by a line 200, such as the combustion of a combustible product (natural gas, hydrocarbons, H2S or others), and even the use of electricity, or a combination of various sources, for example gas and electricity. The selection of the most suitable energy source actually depends on the temperature level that it is desired to attain.

It can also, and, preferably, be carried out in two separate stages: a first stage of heating by an external heat source to a temperature T4, followed by a stage of heating to temperature T1, by reaction with a gas that contains oxygen (for example air or preferably oxygen), whose injection is shown by a line 300. In the case of the use of a gas that contains oxygen, it is also possible to inject, either with this gas or with the feedstock, a relatively small amount, for example 1 to 5% of the H2S flow rate, of a gas that contains hydrocarbons (for example natural gas). A partial combustion of theses hydrocarbons mixed with H2S is thus carried out, which makes it possible to increase the production of hydrogen, but to the detriment of the rate of decomposition of the H2S. The usual presence of a small amount of hydrocarbons (several % by volume) in the H2S-rich gases that are found in the refineries ensures that in general it is not necessary to carry out such an addition of hydrocarbons.

To obtain a high decomposition rate of the H2S, it is necessary to heat the gas to a high temperature T1, at least between 1000 and 1700° C. (higher temperatures that are presently not readily technologically feasible), preferably between 1200 and 1600° C., more preferably still between 1300 and 1500° C., this last value representing the upper limit for the refractory materials that are usually used in the presence of H2S. In the presence of H2S, such temperatures can be attained only if ceramic materials are used. Ceramic furnaces, such as those described in Patents FR 2662158, FR 2616518, FR 2616520 and FR 2715583, will therefore have to be used for heating H2S.

The decomposition of H2S into hydrogen and elementary sulfur is promoted thermodynamically by low pressures. From the standpoint of the decomposition rate, it is therefore advantageous to carry out this heating stage under the lowest pressure possible. Working under vacuum can be unfavorable, however, in terms of size and therefore cost of equipment, as well as from the standpoint of the safety of the installation (risk of air leak). This heating stage will therefore preferably be carried out under a pressure that is less than 2 bar absolute, more preferably under a pressure that is approximately equal to the atmospheric pressure.

After the heating stage, stage Z1 comprises a second quick cooling stage by mixing gas at temperature T1 with a fluid FQ at a temperature T2 so as to obtain a mixture temperature T3, such that the recombination between the hydrogen and the elementary sulfur can no longer be obtained quickly (i.e., significant recombination rates of at least several %, can be obtained only with high dwell times of at least 1 s). Such a temperature can be at most equal to 900° C. In the process according to the invention, it will preferably be between 500 and 700° C.

Temperature T2 can be as low as possible, based on the conditions (nature, pressure, liquid or gaseous state) of fluid FQ, for example lower by at least 200° C. than temperature T3. Fluid flow rate FQ will be defined by the hot gas flow rate and conditions of temperature (T1, T2, T3) that will have been set.

Fluid FQ will be selected so as to be easily separated from the components of the mixture that is thus obtained during stage Z2. It can thus be recycled from stage Z2 to the quick cooling stage of stage Z1 via a line 70. It will be possible to select, for example, water in liquid form or gaseous form. Other compounds, and in particular the components of the mixture such as, for example, H2S, and even hydrogen, can also be used.

Fluid FR is usually the motive fluid, and the gas at temperature T1 is the fluid that is drawn in.

It was discovered that by carrying out the mixing between the hot gas and fluid FQ by means of at least one gas-gas ejector, it is possible to obtain extremely short mixing times, on the order of 1 ms, and even less, if fluid FQ is steam. It is then possible to "set" the composition of the gas such that it is obtained at temperature T1. By almost entirely avoiding the recombination of hydrogen with elementary sulfur, it is then possible to maximize the amount of hydrogen that is produced.

It is also possible to use a gas-liquid ejector.

The gas that is thus cooled to temperature T3 is then admitted via a line 40 to separation/conversion stage Z2.

This stage Z2 comprises at least one stage for separating the elementary sulfur that is formed, which is recovered via a line 60, as well as a stage for separating fluid FQ that can then be recycled to stage Z1 via line 70. A gas that contains hydrogen is recovered via a line 50. Other stages may also be necessary, according to the nature of the fluids that are used. It is thus possible to have an H2S/H2 separation stage that then makes it possible to recover the unreacted H2S that is present in the effluent of stage Z1 and to recycle it to this same stage Z1 via a line 80. Examples of such stages are described in more detail and in a non-exhaustive manner in connection with FIGS. 2 and 3.

Figure 2:
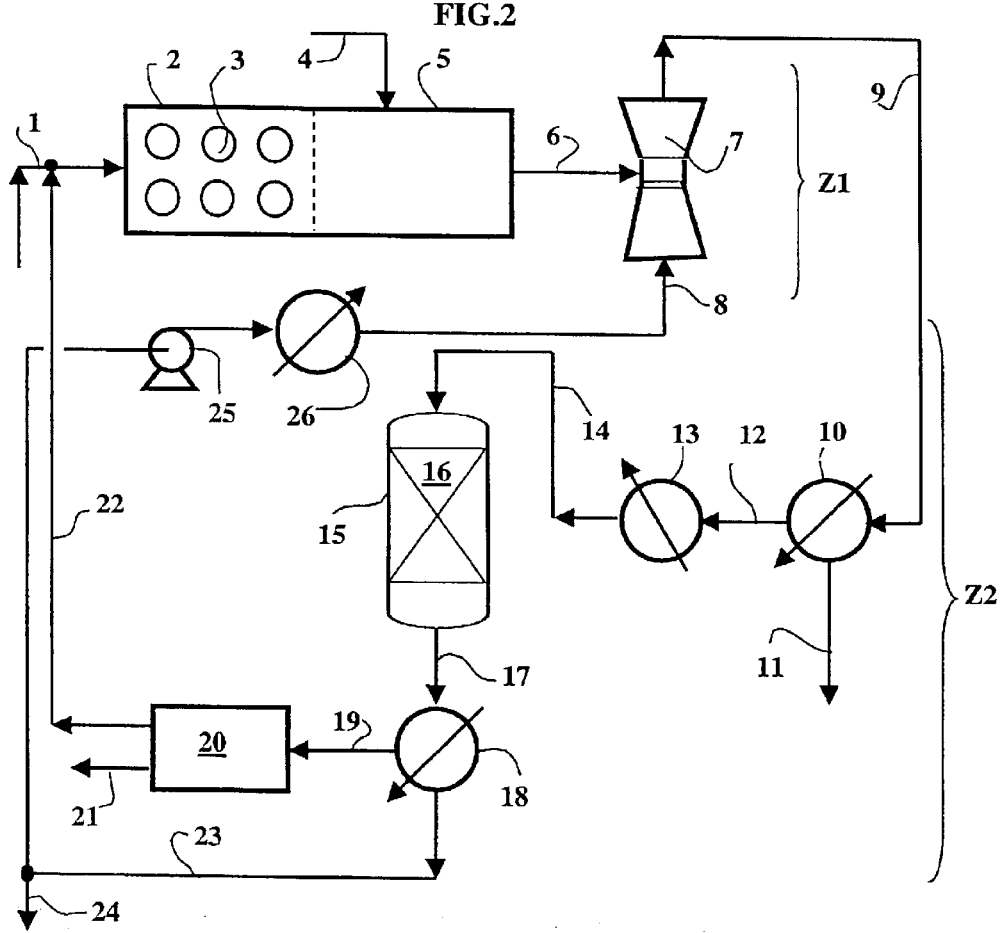
FIG. 2 represents a preferred method in which the stage for heating the feedstock, the very quick cooling of the effluent and the various stages of separation of the sulfur, the steam and the components of the effluent are shown in a detailed manner.

An embodiment of the process according to the invention is described in a more detailed manner in connection with FIG. 2.

The gas that contains H2S is admitted into heating section 2 of the furnace via line 1. It is preferably a gas that consists for the most part of H2S, for example the gases of the amine units in refineries typically contain more than 90% by volume of H2S, whereby the remainder consists of variable proportions of CO2, methane and heavier hydrocarbons than methane, as well as steam. Other H2S-rich gases or mixtures of such gases can also be treated by the process of the invention. The top gases of the acid water strippers, usually found in a refinery, thus can contain equivalent proportions of H2S, steam and ammonia. In the process of the invention, the ammonia will be almost entirely separated from nitrogen and hydrogen. It should be noted that this type of gas, if it is admitted into a Claus unit, can cause various operating problems (clogging, corrosion). It is an advantage of the process of the invention to be able to treat such gases easily by decomposing the $H_2S$ and generating hydrogen.

The H2S that is unconverted and finally recovered in concentrated form at amine unit 20 is also admitted, via a line 22, at the inlet of the furnace.

The heating section 2 comprises a chamber that is coated with a refractory material inside which the gas circulates and where heating elements 3 are placed. Embodiments of such units are described in Patents FR 2662158, FR 2616518, FR 261 6520 and FR 271 5583. Patent FR 2662158 describes a unit in which the heating elements consist of ceramic linings in which electric resistors are placed. Patents FR 2616518, FR 261 6520 and FR 271 5583 describe units in which the heating elements consist of ceramic tubes that allow the exchange of the heat between the gas to be heated that circulates inside chamber 2 and a hotter gas that is obtained by combustion of a combustible gas, for example natural gas.

The heating by combustible gas is preferably conducted in this section 2, at least to a certain temperature, taking into account that its cost is lower than that of electricity for the same amount of heat. The technological limit in the current prior art of this heating method is approximately 1100–1200° C. in the heated gas. It is then possible to reach higher temperatures in this section 2 by using electric heating once this temperature limit is reached.

To avoid resorting to electrical energy as a heat source, however, it is preferable to heat the gases in section 2 only to a temperature T4, the highest possible with gas heaters, preferably between 1000 and 1200° C. The H2S that is present in the gas that is thus heated is then partially decomposed, whereby the decomposition rate is on the order of 29% at 1100° C.

It is also possible in this section 2 to put the gas into contact, simultaneously or alternately, with the heating elements and with a suitable catalyst that promotes the decomposition of H2S. Such a variant is described in more detail below in connection with FIG. 4.

The gas then passes into reaction heating section 5 of the furnace. This section, in direct communication with section 2, consists of a chamber that is coated with a refractory material and a device that makes possible the injection into the hot gas of a gas that contains oxygen, typically air and preferably industrially pure oxygen, via a line 4, which avoids introducing the nitrogen and the necessity of having to carry out a hydrogen-nitrogen downstream separation. The amount of oxygen that is introduced is adjusted based on the required temperature at the outlet of this section 5; it is preferably less than 0.2 mol per mol of treated H2S, more preferably between 0.1 and 0.15 mol per mol of treated H2S.

The introduction of oxygen at section 5 makes it possible, by reaction with H2S, to raise the temperature to required value T1 and thereby to increase the decomposition of H2S and therefore the production of hydrogen (relative to what is obtained at temperature T4 at the outlet of section 2). The oxygen that is introduced will actually react with H2S essentially to form elementary sulfur and steam, by releasing heat. It will be seen in the comparison example that there is then obtained, for same temperature T1 at the furnace outlet, a higher conversion rate of H2S into elementary sulfur than the one that is obtained by the use of external heating means only, with, however, a hydrogen formation rate (in mol of H2 per mol of formed elementary sulfur) that is, of course, slightly lower, but nevertheless remains high.

A gas at temperature T1, essentially consisting of hydrogen, elementary sulfur (primarily in S2 form) and unreacted H2S , is then obtained at the outlet of the furnace. The proportions of these various components depend on the specific conditions of use of the process and more particularly the temperature. This gas will also contain steam in proportion to the amount of oxygen introduced and water that is optionally present at the inlet of the furnace. Finally, when the gas that is introduced into the furnace contains CO2 or hydrocarbons, these compounds will be found at the outlet of the furnace for the most part in the form of CO and CO2, under respective ratios that depend primarily on the temperature. Secondary reactions thus will also lead to the formation of sulfur-containing radicals COS and CS2 that are found in small proportions, typically less than 0.1% by volume in all, in the gas at the outlet of the furnace. The injection of oxygen also leads to the formation of small amounts of SO2, typically less than 0.5% mol, in the output gas.

This gas is then brought via line 6 near the throat of a gas-gas ejector 7 where it is drawn in via coolant FQ, which is injected as the motive fluid via a line 8 upstream from the throat of the ejector. FQ is injected under a pressure that is higher than the pressure that will be obtained at the outlet of the ejector, preferably higher than 2 bar absolute, more preferably at least equal to 10 bar absolute. Fluid FQ that is used in connection with FIG. 2 will preferably be water in vapor or liquid form. The use of liquid water leads to using a molar flow rate of water that is less than the vapor (the amount of water to be provided is defined by temperature T3 that is sought at the outlet of the ejector and by the enthalpic balance that is derived therefrom). By contrast, the mixing time will be longer than with steam. The latter will therefore be preferred so as to avoid any recombination of hydrogen with elementary sulfur. The temperature of the injected steam will be at least higher than the condensation temperature at the pressure in question. According to the pressures and temperatures in question, the ratio between the molar flow rate of fluid FQ, in particular the steam and that of the hot gas, can be between 0.5 and 10, preferably between 1 and 3.

Obtaining, with the ejector, a very short mixing time between the hot gas and fluid FQ makes it possible not only to avoid almost entirely the recombination of hydrogen with sulfur (typically, there will be less than 5% of the hydrogen formed in the furnace that will recombine with the sulfur), but also to avoid other reactions, in particular when fluid FQ is water, whereby the inverse reaction of Claus reaction (2) can result in forming SO2 and H2S from elementary sulfur and water. The gaseous mixture that is obtained downstream from the ejector will therefore have a composition that is approximately equal to that of the hot gas at the outlet of the furnace, supplemented with components of fluid FQ.

Finally, another advantage that is linked to the use of an ejector is obtaining at an outlet line 9 of ejector 7 a mixture that is under a pressure that is greater than that of the hot gas that is drawn in by the ejector. It is thus possible to carry out the decomposition of H2S at a pressure that is very close to the atmospheric pressure and to use, nevertheless, downstream from the ejector, an adequate pressure to overcome the losses of feedstock of the various equipment of stage Z2, without having to recompress the gas. Even in the cases where a stage for recompression of the gas would prove necessary downstream from the ejector, the cost of this stage would be essentially reduced because of the gain of pressure that is obtained with the ejector. The pressure downstream from the ejector will be increased, relative to that of the gas that is drawn in via line 6, by a value that is based on the amount and the pressure of fluid FQ, generally less than 1 bar, preferably between 0.05 and 0.5 bar.

The mixture that is obtained at the ejector outlet is then sent via a line 9 to a heat exchanger 10. Its temperature is lowered there to a value that allows the condensation of the elementary sulfur that is then separated and extracted via a line 11. This temperature will generally be between 120 (melting point of the elementary sulfur) and 180° C., preferably between 120 and 150° C.

The cooled gaseous mixture, from which the sulfur was thus extracted, is then brought, via a line 12, to a heater 13, which makes it possible to raise its temperature to an adequate value to be able to carry out a catalytic hydrogenation of the residual sulfur-containing components of the mixture, other than H2S, i.e., the traces of SO2, COS, CS2 and residual elementary sulfur, which will react with the hydrogen that is present in the gas. Temperatures that are at least equal to 200° C., for example between 200 and 400° C., are preferably selected.

This catalytic hydrogenation is carried out in a reactor 15, connected via a line 14 to heater 13, in the presence of a suitable catalyst 16. The catalysts that are based on cobalt and molybdenum are usually used for such an operation. This hydrogenation stage makes it possible to have in the output effluent from reactor 15 only H2S as the sole sulfur-containing compound, without thereby consuming large amounts of hydrogen, whereby the compounds to be hydrogenated are present only in the form of traces.

The gas that is recovered via a line 17 at the outlet of reactor 15 thus contains only H2S, hydrogen and steam as major components. The carbon-containing compounds that are present in the gas at the inlet of the hydrogenation stage, in the form of CO and CO2, will be found at the outlet of this stage in the form of CO2, CO or CH4, in respective proportions that depend both on the temperature at which the hydrogenation stage is carried out as well as the type of catalyst that is used. To maximize the hydrogen production, it will be possible to achieve conditions that promote the conversion of CO to CO2 and hydrogen by reaction with steam, according to reaction (5):

$$CO + H_2O \rightarrow CO_2 + H_2 \quad (5)$$

This gas is then cooled in exchanger 18 to a temperature that makes it possible to separate by condensation the majority of the steam that it contains. This temperature can preferably be between 20 and 80° C., more preferably between 40 and 70° C.

The liquid water that is thus separated contains only very low contents of other components of the gas, given their weak solubility in pure water. It can then be recycled, at least in part via a line 23, to ejector 7, where it will be injected after having been brought to the required pressure by a pump 25, then evaporated and heated in an exchanger 26. Part or all of the heat that is to be provided by exchanger 27 can be provided by the heat that is yielded by the hot gas that is cooled in exchanger 10; the external supply of heat that is necessary to the process is thus limited.

The excess water that optionally will have been condensed in exchanger 18 (water that is formed by the reaction in section 5 of the furnace) can be evacuated via a line 24 toward an optional treatment that allows its release into the environment.

Finally, the cooled gas that contains only a small amount of gaseous water can be brought, via a line 19, to an amine scrubbing unit 20 that makes it possible to extract selectively the H2S that is present in this gas. Then, on the one hand, a gas that essentially consists of hydrogen optionally with small amounts of CO2 and/or CO, and even methane, which can be used, after optional purification if necessary, in other processes, is recovered via a line 21, and, on the other hand, a gas that essentially consists of H2S optionally with a small amount of CO2 is recovered. The latter gas can be recycled, via a line 22, at the inlet of first section 2 of the furnace. It can be noted that whereby the heating stage in furnace 2 is operated at a pressure that is close to the atmospheric pressure, it will not in general be necessary to provide a means for compressing the H2S between amine unit 20 (which can produce an acid gas under a pressure that is slightly greater than the atmospheric pressure) and furnace 2.

The selection of an amine scrubbing process for separating H2S from the hydrogen that is formed corresponds here only to the most current practice in the industry. It is not, of course, an exclusive selection, and any other suitable separation process could be used (for example, physical solvent, adsorbents, . . . ).

Figure 3:
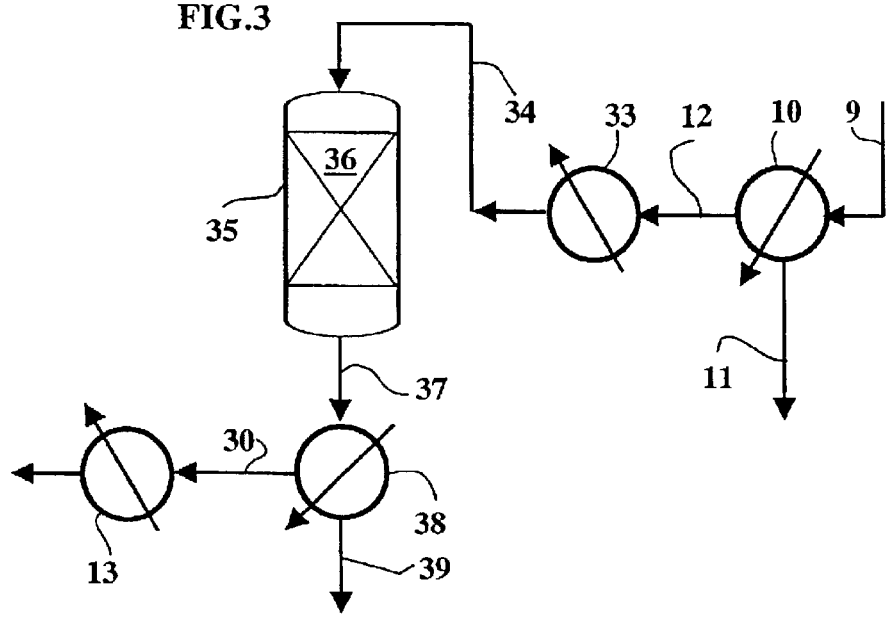
FIG. 3 shows a Claus reaction stage that is interposed between the elimination of the elementary sulfur and the hydrogenation reaction of the residual sulfur-containing compounds.

FIG. 3 represents a Claus catalytic stage and its insertion during stage Z2 of the process of the invention, as a variant embodiment of this stage Z2. Elements 9 to 14 of this figure are those of preceding FIG. 2.

According to an implementation of the process of the invention, it may happen that the amount of SO2 that is present in the gas, after the separation of the sulfur by condensation in exchanger 10, is greater than the low values, less than 0.5% by volume, that are usually obtained. This can be the case particularly if a significant amount of oxygen (greater than the values preferably used) is used during the reaction heating stage in section 5 of the furnace. This can also be the case when, because of the characteristics of the embodiment of the equipment between the outlet of ejector 7 and exchanger 10, the gas remains at a temperature T3 for a sufficient duration so that the inverse of Claus reaction (2) can occur. Actually, this temperature T3, preferably between 500 and 700° C., corresponds to a zone where the Claus equilibrium opposes the formation of elementary sulfur.

In all of these cases, it can then be advantageous to convert the SO2 into elementary sulfur by the Claus reaction with H2S, rather than by hydrogenation in reactor 15. This conversion will be possible provided that it is placed under temperature conditions that promote the formation of sulfur by the Claus reaction, and, of course, after having separated at exchanger 10 the elementary sulfur that is present in the gas.

To this end, the gas that is obtained from exchanger 10 via line 12 is then admitted into a heater 33 where it is brought to a suitable temperature for the Claus reaction, preferably between 180 and 330° C., more preferably between 180 and 250° C. The gas that is thus heated is then admitted via a line 34 into a reactor 35 that contains a suitable catalyst 36. The catalysts that are usually used for this type of reaction essentially consist of alumina. It is also possible to use catalysts with a titanium oxide and alumina base. These catalysts are known for promoting not only Claus reaction (2) but also the hydrolysis reactions of compounds COS and CS2 (6) and (7):

$$COS + H2) \rightarrow CO2 + H2S \quad (6)$$

$$CS2 + H2O \rightarrow COS + H2S \quad (7)$$

At the outlet of reactor 35, the gas whose major portion of SO2 was converted into elementary sulfur can then be admitted via a line 37 into an exchanger 38 where it is cooled to a temperature, for example 120 to 180° C., that allows the condensation of the elementary sulfur. This sulfur is then evacuated via a line 39. The gas from which the major portion of the elementary sulfur is removed can then be sent, via a line 30, to heater 13 that is upstream from hydrogenation reactor 15.

This variant of the process makes it possible to minimize the consumption of hydrogen and the formation of H2S at the hydrogenation stage.

Figure 4:
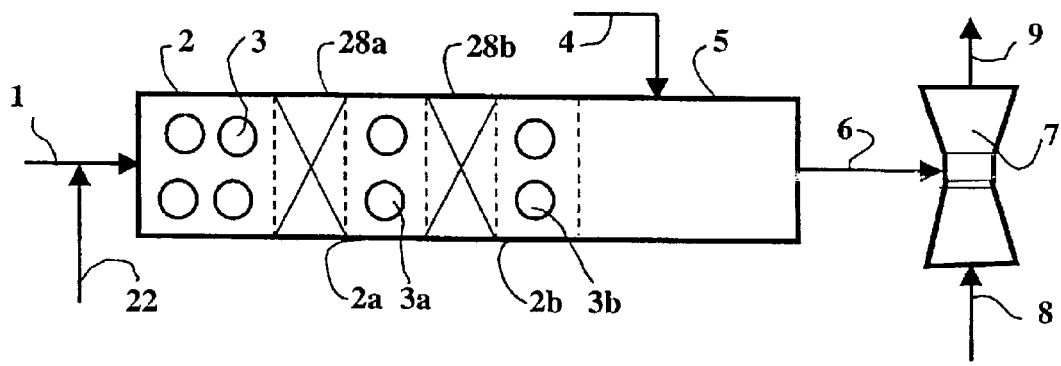
FIG. 4 illustrates the heating stage in which the external heating zones alternate with catalytic zones.

FIG. 4 represents a variant of the process of the invention in which a catalyst is used, promoting the decomposition of H2S into elementary sulfur and hydrogen, at the heating stage of H2S by an external heat source, in section 2 of the furnace. The elements of FIG. 2 are shown with the same references in FIG. 4.

Actually, this section operates up to a temperature of between 1000 and 1200° C. Beyond 1000° C., the decomposition equilibrium of the H2S is reached very quickly and without a catalyst. Below this temperature, however, if the dwell time is insufficient, it may be that the decomposition equilibrium is not reached. In the absence of catalyst, the approach may be to decompose H2S later, and in particular in reaction heating section 5, certainly in a relatively small amount, which could be decomposed in section 2. For this purpose, the approach will therefore be to increase the consumption of oxygen at this section 5.

The use of a catalyst at section 2 can therefore make it possible to minimize the consumption of oxygen in the process of the invention.

For this purpose, a suitable catalyst, preferably a metallic catalyst, can be placed either in separate catalytic zones that alternate with the heating zones by heating elements 3, or in dead volumes that are present between these heating elements, in section 2 of the furnace. Patent EP-A-794150 describes various embodiments of catalytic furnaces that can be used in the process of the invention.

By way of illustration, a furnace where a first heating section 2 is followed by a first catalytic section 28a is shown in FIG. 4. The decomposition reaction of the H2S being endothermic, the temperature will drop in this section 28a. Downstream from this section 28a, there is a second heating section 2a that contains heating elements 3a, itself followed by a second catalytic section 28b, then a third heating section 2b with its heating elements 3b. The number of catalytic sections and heating indicated in this figure is not limiting, of course, and can be adapted to the specific conditions of the process.

Figure 5:
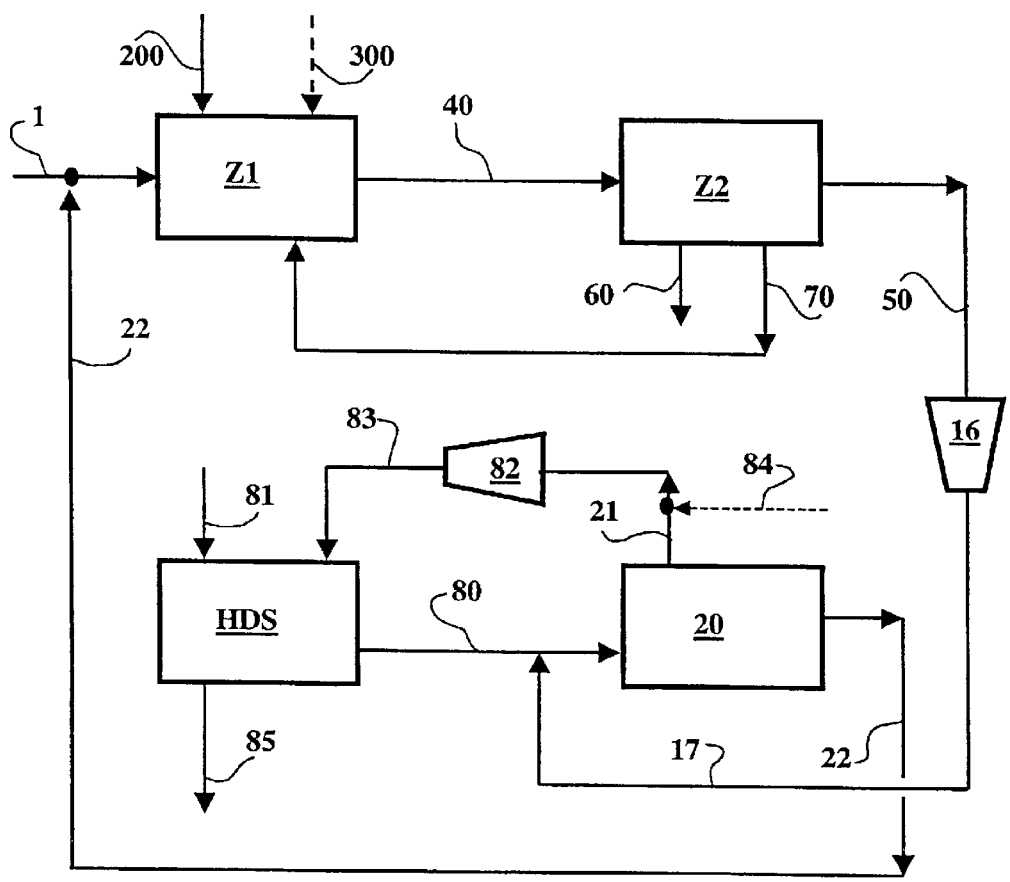
FIG. 5 represents the combination of a hydrodesulfurization stage of a petroleum fraction with the process of the invention.

FIG. 5 illustrates the integration of the process of the invention with a conventional hydrodesulfurization unit that is usually found in a refinery. Stages Z1 and Z2 of the process of the invention are shown diagrammatically as in FIG. 1, whereby the elements of FIG. 1 are identical to those of FIG. 5. Stage Z2 in particular this time comprises only the stages for separation of the elementary sulfur, evacuated via line 60, and coolant FQ, recycled via line 70, as well as optionally the stage for hydrogenation of the sulfur-containing compounds. The stage for separation between H2S and hydrogen does not appear, however, in stage Z2.

The hydrodesulfurization unit comprises the hydrodesulfurization section itself (HDS) that includes in particular the reaction section, where a petroleum fraction that contains sulfur-containing compounds is reacted with a hydrogen-containing gas so as to convert these compounds into H2S, and the gas-liquid separation at the reaction section outlet. This HDS unit is fed with a petroleum fraction that is to be desulfurized via a line 81. The desulfurized petroleum fraction is evacuated via a line 85.

The gas that is rich in hydrogen and that contains H2S, exiting from the HDS section via a line 83, is admitted to an amine unit 20 (or any other process that makes it possible to separate the H2S from the hydrogen). This unit produces, on the one hand, an H2S-rich gas, which can then supply the process of the invention via a line 22, and, on the other hand, a gas that is rich in hydrogen and poor in H2S that can be recycled to the HDS unit via lines 21 and 83, with a recycling compressor 82. A line 84 for the addition of fresh hydrogen is depicted in dotted form. This addition is usually necessary for compensating the hydrogen that is consumed at the reaction section of the HDS.

Within the scope of the process shown in this figure, this addition can be considerably reduced, and even eliminated, whereby the hydrogen that is necessary is produced by the process of the invention in the form of a mixture that essentially contains hydrogen and H2S. This mixture is compressed by a compressor 16 to the pressure of the gas exiting the HDS unit, typically from several bar to several tens of bar. The compressed mixture is then passed via a line 17, and mixed with the HDS gas entering the amine unit.

The advantage of the process that is thus described is to allow the separation between the H2S and the hydrogen that is produced by the process of the invention, in an existing amine unit. It is therefore not necessary in this case to provide a second specific amine unit for the process of the invention, which considerably reduces the investment costs of the unit.

It is thus further possible, in a general manner, to combine the process of the invention with any process that relies on an operation of selective separation of H2S and that allows the mixing of the hydrogen that is produced with the desulfurized gas: treatment of natural gas for producing a hydrogen-enriched natural gas, for example.

EXAMPLES

Example 1 below illustrates an implementation of the process of the invention in connection with FIG. 2.

64.7 mol per hour of a gas that contains 94.11% mol of H2S, 2.01% mol of CO2, 3.09% mol of CH4 and 0.79% mol of steam is brought via line 1.

35.3 mol per hour of a gas that contains 96.63% mol of H2S, 1.98% mol of CO2 and 1.39% mol of steam is recycled from amine unit 20, via line 22.

These two gaseous flows are mixed, reheated to a temperature of 200° C., in a heat exchanger that is not shown in the figure , then admitted into the atmospheric pressure in ceramic furnace 2. This total gaseous flow G1, thus supplying furnace 2, therefore represents 100 mol per hour of a gas that contains 95% mol of H2S, 2% mol of CO2, 2% mol of CH4 and 1% mol of steam.

Ceramic furnace 2 is equipped with ceramic heating elements 3, comprising a natural gas burner and a ceramic tube for heat exchange between the flame that is produced by the combustion of natural gas and gas mixture G1 that circulates in the ceramic chamber of the furnace. An amount of heat that represents 6721 Kjoules per hour is thus transferred to mixture G1. This mixture is thus carried to the outlet of furnace 2 at a temperature of 1100° C. At this temperature, the reactions for decomposition of H2S and methane result in composition G2, indicated in Table 1.

Mixture G2 then passes into ceramic reaction chamber 5 where it is mixed with a flow of 12 mol per hour of pure oxygen, injected at ambient temperature via line 4, and an injection device. The reaction with oxygen produces, at the outlet of reaction chamber 5, a flow of 136 mol per hour of a gas G3 that is brought to 1450° C., whose composition is indicated in Table 1.

The losses of feedstocks observed in furnace 2 and reaction section 5 are almost zero, and gases G2 and G3 are therefore at atmospheric pressure.

Hot gas G3 is drawn in, via line 6 in gas-gas ejector 7, by a flow of 336 mol per hour of steam. This steam feeds ejector 7, via line 8, under a pressure of 10 bar absolute and a temperature of 220° C.

Then, via line 9, at the ejector outlet, a mixture of 471 mol per hour of a gas G4 that is cooled to 579° C. is obtained under a pressure of 1.3 bar absolute. Whereby the time of mixing in the ejector is on the order of 1 ms, Table 1 shows that the composition of gas G4 will produce a low rate of recombination of the hydrogen that is present in gas G3 with elementary sulfur, equal to 4%.

This gas G4 is then cooled in two steps in exchanger-condenser 10.

In a first step, it is cooled to a temperature on the order of 220° C. by exchange with 336 mol per hour of pressurized liquid water that exits from pump 25. By exchange with the hot gas, this liquid water is partially evaporated at a temperature of 180° C. under 10 bar absolute. The amount of heat that is recovered by cooling gas G4 from 579 to 220° C. makes it possible to evaporate 272 mol per hour of liquid water, or 81% of the total flow rate of liquid water that is to be evaporated. The water that is thus partially evaporated is then evaporated entirely and then superheated to 220° C. by an external heat source (for example high-pressure vapor) in a second section of the same exchanger. The superheated steam that is thus produced can then feed ejector 7 via line 8. The amount of external heat to be provided is then 2383 KJoules per hour.

In this configuration, the heat exchange between gas G4 and the liquid water to be evaporated also represents only the first stage of exchanger 10. The amount of heat that is thus exchanged represents 9426 KJoules per hour. In a second step, the gas is cooled from 250° C. to 150° C. by exchange with the air or any other suitable coolant. It is thus possible to condense the bulk of the elementary sulfur that is present in gas G4. At the outlet of condenser 10, a flow of 1.947 kg/h of liquid elementary sulfur is then obtained via line 11, and 440.3 mol per hour of a gas mixture G5 is obtained via line 12, under a pressure of 1.25 bar absolute, whose composition is indicated in Table 1.

This gas, from which elementary sulfur is removed, is then heated in heater 13 to a temperature of 300° C. and then admitted into reactor 15. This reactor contains 4 1 of a catalyst with a cobalt and molybdenum base, deposited on an alumina substrate.

At the outlet of reactor 15, via line 17, 439.7 mol per hour of a mixture G6, whose composition is provided in Table 1, is obtained at a temperature of 316° C., under a pressure of 1.15 bar absolute (1 bar=$10^5$ Pa).

This mixture is cooled in exchanger 18 to a temperature of 40° C., making possible the condensation of 354 mol of water, 18 of which will be evacuated via line 24. The 336 mol of water that remains will be taken up by pump 25, which will inject it under a pressure of 10 bar absolute into exchanger 27 (whose first section corresponds to the first section of exchanger 10).

Via line 19, 85.7 mol per hour of a gas under a pressure of 1.1 bar absolute is then recovered; its composition G7 is indicated in Table 1. This gas is sent to amine washing unit 20, which makes it possible to extract H2S selectively from this gas.

On one hand, 35.3 mol per hour of a gas that contains 96.63% mol of H2S, 1.98% mol of CO2 and 1.39% mol of steam, which is recycled via line 22, is thus recovered from amine unit 20.

On the other hand, 46 mol per hour of a hydrogen-rich gas is recovered at atmospheric pressure, containing 90.43% mol of H2, 7.17% mol of CO and 2.40% mol of $H_2O$, optionally with residual traces of CO2 or COS (according to the effectiveness of the purification stages that have just been described. This gas can then be used in other refining processes, either as is or after having undergone optional additional purification operations.

TABLE 1

| | Characteristics of Fluids Used in Example 1 | | | | | | |
|---|---|---|---|---|---|---|---|
| Composition (% mol) | G1 (1) | G2 (2) | G3 (6) | G4 (9) | G5 (12) | G6 (17) | G7 (19) |
| H2   | —     | 25.38 | 33.06 | 9.16  | 9.81  | 9.46  | 48.53 |
| H2S  | 95.00 | 59.44 | 22.78 | 6.96  | 7.45  | 7.76  | 39.80 |
| CO   | —     | 2.88  | 2.43  | 0.70  | 0.75  | 0.75  | 3.85  |
| CO2  | 2.00  | 0.06  | 0.44  | 0.13  | 0.14  | 0.16  | 0.82  |
| H2O  | 1.00  | 1.06  | 17.68 | 76.42 | 81.77 | 81.87 | 7.00  |
| CH4  | 2.00  | —     | —     | —     | —     | —     | —     |
| COS  | —     | 0.22  | 0.07  | 0.02  | 0.02  | —     | —     |
| CS2  | —     | 0.27  | (29 ppm) | (8 ppm) | (9 ppm) | —     | —     |

TABLE 1-continued

Characteristics of Fluids Used in Example 1

| Composition (% mol) | G1 (1) | G2 (2) | G3 (6) | G4 (9) | G5 (12) | G6 (17) | G7 (19) |
|---|---|---|---|---|---|---|---|
| Elementary S | — | (1)10.69 | (1)23.41 | (1)6.57 | (2)0.03 | — | — |
| SO2 | — | — | 0.13 | 0.04 | 0.04 | — | — |
| Total (mol) | 100.00 | 116.44 | 136.00 | 471.00 | 440.30 | 439.7 | 85.7 |
| T(° C.) | 200 | 1100 | 1450 | 579 | 150 | 320 | 40 |
| P (bar a.) | 1.00 | 1.00 | 1.00 | 1.30 | 1.25 | 1.15 | 1.10 |

(1) Elementary S primarily in S2 form at temperatures of higher than 570° C.
(2) Elementary S in S8 form at 150° C.

Example 2

Example 2 below makes it possible to compare the performances of the process of the invention according to which as in Example 1, pure oxygen is used to pass from 1100 to 1450° C. or electric heating is used.

As in Example 1,100 mol per hour of a gas G1 feeds section 2 of the furnace at a temperature of 200° C. In this section 2, the gas is heated to 1100° C. by heating elements that use the combustion of natural gas. At the outlet of section 2, gas G2 (identical to the one of Example 1) at 1100° C. is admitted into a section 5b (not shown) that this time comprises heating elements that consist of ceramic heat exchange tubes, this time containing electric resistors, making it possible to reach a temperature of 1450° C., without injection of oxygen. The electric heat provided to this gas represents 4535 Kjoules per hour.

Then, via line 6, 131.74 mol of a gas G3' is recovered at atmospheric pressure and having the following composition (in % mol):

H2: 45.39

H2S: 29.67

CO: 2.84

CO2: 0.02

H2O: 0.83

COS: 0.08

CS2: 0.10

S2: 21.07

It is possible by comparing the compositions of gases G3 and G3' to compare the performances of two processes, in terms of sulfur production, of hydrogen as well as in terms of operating cost (energy to be provided, consumption of oxygen). These comparisons are summarized in Table 2. Relative to the energy to be provided, only that provided at the furnace was taken into account. The energy to be provided downstream from the furnace, whether for various separation/conversion operations of stage Z2 or for evaporating the water that is used as a motive fluid in the gas-gas ejector, is essentially identical, regardless of the heating method that is used in the furnace; it therefore is not useful to take it into account if it is desired only to compare the electric heating and the heating by reaction of gas with the oxygen.

TABLE 2

Comparison of Electric Heating/Reaction with O2

| Method of Heating from 1100 to 1450° C. | Oxygen | Electric |
|---|---|---|
| Conversion Per Pass of H2S into S2 (%) | 67.05 | 58.44 |
| Ratio of mol of H2 produced/mol of S produced (in S1) | 0.706 | 1.077 |
| Consumption of thermal energy (gas): | | |
| KWh/kg of S produced | 0.93 | 1.05 |
| KWh/kg of H2 produced | 21.25 | 15.58 |
| Consumption of electric energy: | | |
| KWh/kg of S produced | — | 0.71 |
| KWh/kg of H2 produced | — | 10.5 |
| Consumption of pure oxygen: | | |
| Kg of O2/kg of S produced | 0.19 | — |
| Kg of O2/kg of H2 produced | 4.36 | — |
| Heating section operating cost* | | |
| FF/kg of S produced | 0.11 | 0.22 |
| FF/kg of H2 produced | 2.58 | 3.19 |

*The operating cost is the sum of the cost of the thermal energy, based on 0.07 FF/KWh, of the electric energy, based on 0.2 FF/KWh, and pure oxygen, based on 0.25 FF/kg of O2.

It is seen that the electric process provides, of course, a better performance in terms of specific production of hydrogen. This is explained by the fact that all of the converted H2S is transformed into hydrogen and sulfur whereas in the version with oxygen, a fraction of the H2S is converted into steam and sulfur. The value that is higher than 1 mol of H2 per mol of sulfur, in the electric version, is obtained from the decomposition of the methane that is present in the treated gas.

The oxygen process, however, offers a much higher conversion yield per pass of H2S, which is advantageous from the standpoint of investment (by minimizing the volume of the recycled H2S, the size of the equipment is minimized).

Finally, the economic comparison, which alone makes it possible to compare costs of a different nature (gas, O2 and electricity), shows that not only the version with oxygen is twice less expensive in terms of cost per kg of sulfur that is produced, but also that it is even close to 20% less expensive in terms of cost per kg of hydrogen that is produced.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/05.848, filed Apr. 30, 2001, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the production of a gas that contains hydrogen from a feedstock consisting essentially of hydrogen sulfide, comprising at least the following stages:

(1) generating from the feedstock a gaseous effluent that contains at least hydrogen and elementary sulfur, (2) condensing and separating the elementary sulfur from the gaseous effluent and recovering a gaseous effluent that contains hydrogen, the improvement in stage (1) comprising:

a stage for heating the feedstock that contains the H2S in at least one heating zone to a temperature T1 of between 1300° C. and 1600° C. so as to generate a hot gas that contains at least hydrogen and elementary sulfur, obtained by decomposition of the H2S, said heating being carried out at least in part by an external heat source, a stage for quick cooling of the thus obtained hot gas, comprising mixing the hot gas with a fluid EQ at a temperature T2, so as to obtain the gaseous effluent at a temperature T3 of between ambient temperature and 900° C., under conditions such that the mixing time between the hot gas at temperature T1 and fluid FQ at temperature T2 is less than 5 milliseconds, so as to recover at least 80% of the hydrogen that is formed at equilibrium at reaction temperature T1, and wherein the stage for quick cooling of the hot gas at temperature T1 by mixing with fluid FQ is carried out with an ejector overating with a motive fluid and a draw-in gas, wherein fluid FQ is the motive fluid and the hot gas at temperature T1 is the fluid that is drawn in.

2. A process according to claim 1, wherein the stage for heating the feedstock that contains H2S is carried out in two consecutive sub-stages:

heating of the feedstock gas that contains H2S to a temperature T4 by an external heat source, heating of the thus obtained gas from temperature T4 to temperature T1 by reaction with a gas that contains oxygen.

3. A process according to claim 2, wherein the gas that contains oxygen is air oxygen-enriched air or industrial oxygen.

4. A process according to claim 1, wherein temperature T1 is between 1300 and 1500° C.

5. A process according to claim 1, wherein temperature T3 is between 500° C. and 700° C.

6. A process according to claim 1, wherein temperature T2 is less than temperature T3.

7. A process according to claim 1, wherein fluid FQ is steam, liquid water or a mixture thereof.

8. A process according to claim 1, wherein the mixing time is lower than 2 milliseconds.

9. A process according to claim 1, wherein the mixing time is on the order of 1 millisecond or less.

10. A process according to claim 9, wherein separation stage (2) comprises, in addition to the separation of elementary sulfur by condensation, a separation by condensation of gaseous $H_2O$ that is present in the gaseous effluent.

11. A process according to claim 10, wherein at least a portion of the water obtained by condensation is recycled, after optional evaporation, as fluid FQ to the ejector.

12. A process according to claim 1, wherein the stage for heating the feedstock that contains H2S is carried out at a pressure that is less than 2 bar absolute.

13. A process according to claim 1, wherein the external heat source results from at least one of: combustion of a gas, combustion of a combustible liquid, and electricity.

14. A process according to claim 1, wherein the gaseous effluent contains unconverted $H_2S$; separating said unconverted $H_2S$ and recycling the separated unconverted $H_2S$ to stage (1) for heating the feedstock.

15. A process according to claim 1, wherein the hot gas from the heating stage contains residual sulfur-containing compounds and further comprising a stage for hydrogenation of said residual sulfur-containing compounds into H2S, said hydrogenation stage comprising the following stages:

heating of resultant separated hydrogen-containing gaseous mixture obtained from sulfur condensation in stage (2), at a suitable temperature for carrying out hydrogenation reactions, at least equal to 200° C., reacting said sulfur-containing compounds with the hydrogen in the presence of a suitable catalyst present in said gaseous mixture so as to form H2S.

16. A process according to claim 15, further comprising at least one Claus reaction stage between the stage for condensation of elementary sulfur and the hydrogenation stage, said Claus reaction stage comprising at least the following stages:

heating of the hydrogen-containing gaseous mixture to a suitable temperature for carrying out the Claus reaction, conducting a Claus reaction between H2S and SO2 in the presence of a suitable catalyst present in the resultant heated hydrogen-containing gaseous mixture so as to form elementary sulfur, cooling of effluent gas obtained from the Claus reaction sufficiently to condense elementary sulfur, and recovering the resultant liquid sulfur.

17. A process according to claim 16, further comprising compressing the hydrogen-containing gaseous effluent from Stage (2) and passing the compressed gaseous effluent to a hydrodesulphurization unit comprising an amine scrubbing stage for extraction of residual hydrogen sulfide that is recycled to the Claus reaction stage, upstream from said scrubbing stage.

18. A process according to claim 15, wherein an effluent, after separation of the elementary sulfur, water and hydrogenation of the sulfur-containing compounds, optionally compressed, is separated into a gas containing hydrogen and a gas containing unconverted H2S.

19. A process according to claim 1, wherein temperature T4, less than T1, is between 800 and 1500° C.

20. A process according to claim 1, wherein during the heating of the feedstock by an external heat source, the feedstock is brought into contact alternately or simultaneously with said heat source and with a suitable catalyst that promotes the decomposition of H2S into hydrogen and elementary sulfur.

21. A process according to claim 1, wherein during said mixing. the ratio between the molar flow rate of fluid FQ and that of the hot gas is between 0.5 and 10.

22. A process according to claim 1, wherein the feedstock contains for the most part hydrogen sulfide.

23. A process according to claim 1, wherein the feedstock contains more than 90% by volume of hydrogen sulfide.

* * * * *

UNITED STATES PATENT AND TRADEMARK OFFICE
CERTIFICATE OF CORRECTION

PATENT NO. : 6,780,396 B2
DATED : August 24, 2004
INVENTOR(S) : Christian Streicher It is certified that error appears in the above-identified patent and that said Letters Patent is hereby corrected as shown below:

Column 17,
Line 25, "EQ" should be -- FQ --;
Line 35, "overating" should -- operating --.`

Signed and Sealed this

Twenty-sixth Day of April, 2005

JON W. DUDAS
*Director of the United States Patent and Trademark Office*